No. 751,311. PATENTED FEB. 2, 1904.
L. LEIGH, Jr.
CHUCK FOR ROCK DRILLING MACHINES.
APPLICATION FILED NOV. 18, 1903.
NO MODEL.
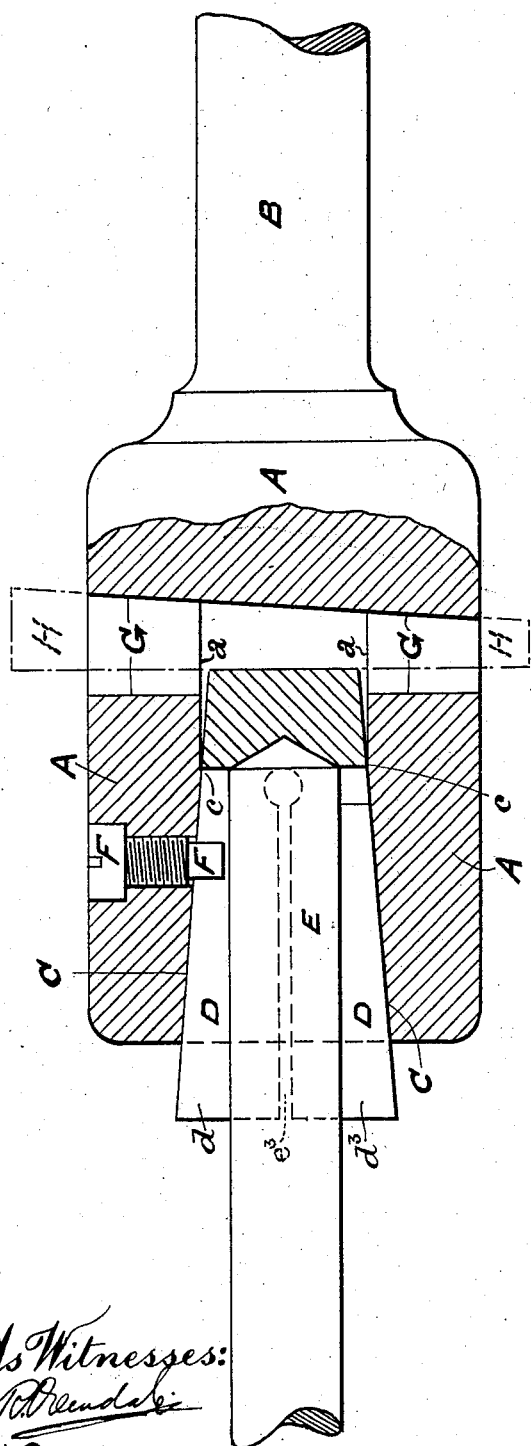
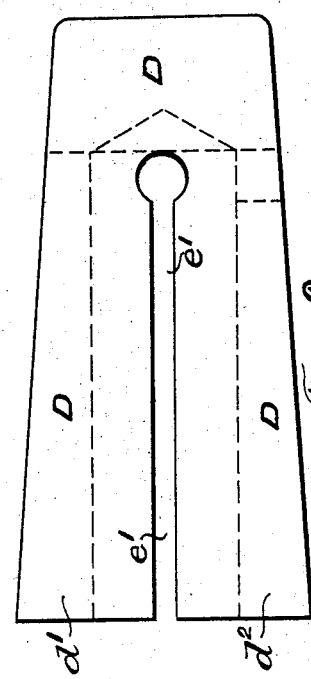
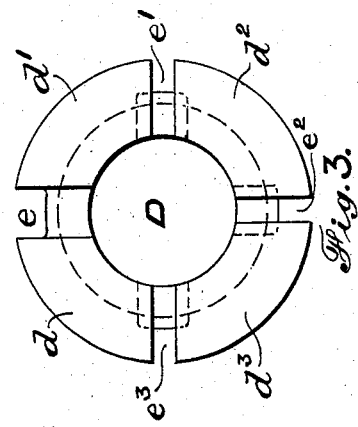

No. 751,311.                                                    Patented February 2, 1904.

UNITED STATES PATENT OFFICE.

LEONARD LEIGH, JR., OF LUIPAARDSVLEI, TRANSVAAL.

CHUCK FOR ROCK-DRILLING MACHINES.

SPECIFICATION forming part of Letters Patent No. 751,311, dated February 2, 1904.

Application filed November 18, 1903. Serial No. 181,698. (No model.)

*To all whom it may concern:*

Be it known that I, LEONARD LEIGH, Jr., a citizen of the United States, residing at Luipaardsvlei, Transvaal, have invented certain new and useful Improvements in the Chucks of Rock-Drilling Machines, of which the following is a specification.

This invention relates to the chucks of rock-drills or rock-drilling machines, and is designed to simplify and improve the construction of the same, to dispense with the use of the ordinary chuck-bolts, and as a consequence materially reduce the cost of upkeep, and, if desired, to obviate the swaging of the steel to fit the chuck-bush. The drills may be removed and renewed with much greater facility and the parts of the chuck may be taken asunder much more easily and quickly than is the case with the present forms of chuck. Further, the drill is centered more satisfactorily, as the wearing of the bushing is uniform instead of at one side, as is the case with chucks where U-bolts are employed.

The invention consists, essentially, in constructing the head with a taper cavity and in fitting therein a taper bush closed at its smaller end to form an abutment to be engaged by the extremity of the drill or bit, said bush being split for a portion of its length in one or more directions longitudinally to form the larger end of the bush into two or more compressible jaws by which the drill is secured as the bush is forced into the conical hole in the head.

To facilitate the description of the invention, a sheet of drawings is appended in which a chuck is illustrated embodying the present improvements and by aid of which drawings I will now proceed to describe the invention in detail.

In the drawings, Figure 1 represents a longitudinal section of the head, showing the bush securing the drill in position. Fig. 2 is a longitudinal elevation of the bush detached and drawn to an enlarged scale, and Fig. 3 is a front elevation of Fig. 2.

A represents the head or main portion of the chuck, which may be formed on or fixed to the outer extremity of the piston-rod B of the rock-drilling machine in the ordinary or any other convenient manner. In the drawings the head is shown of cylindrical external form; but it may be made of any other desired configuration. At the front the head A is formed with a longitudinal taper or conical hole C. The hole C is made taper up to the point $c$, and beyond the point $c$ inward it is made parallel.

In the taper or conical hole C is arranged a taper or conical bush D, by which the shank E, or that portion of the drill projected into the chuck, is gripped and secured. The taper bush D (see more particularly Fig. 3) is split in two directions and at right angles for a portion of its length, thus forming the thicker end of the bush D into four compressible jaws $d\ d'\ d^2\ d^3$. The inner or smaller end of the bush D is made solid or closed and forms a stop for the extremity of the drill E when projected between the jaws $d\ d'\ d^2\ d^3$. The bush D in the drawings is shown with a cylindrical hole formed for the shank or extremity of the drill; but it will be obvious that it may be shaped internally to correspond with the shape of the drill-steel employed.

The top split $e$ in the bush D is preferably made somewhat wider than the other three splits $e'\ e^2\ e^3$, and a set screw or stud F is screwed through the head A so that its inner end projects into or engages the top split $e$ to serve as a stop and prevent the bush being displaced or forced completely out of the head in the operation of removing the drill E.

A transverse taper hole G is formed through the head A in such a position that it intercepts the parallel portion $a$ of the cavity at the bottom. This transverse hole G is provided to admit of the insertion of a drift or cotter H for forcing the bush outward to release the drill.

The head A of the chuck is preferably made of hard steel, and the bush may be made of hard or spring steel, as preferred.

In using the chuck the extremity of the drill E is projected between the jaws $d\ d'\ d^2\ d^3$, formed by the outer split portion of the bush D, until the inner end of the drill engages or abuts the stop or abutment formed by the solid or closed inner end of the bush. When pressure is applied on the outer extremity of the drill-bit, (as by operating on the rock-face,) the bit then forces the bush inward into the head and compresses the jaws round the shank of the drill, and so secures it in position in the chuck. In the operation of removing the drill for the purpose of renewing the same a drift or cotter H is placed in and driven into the transverse hole G in the head A and engaging the inner end of the bush D forces it forward partially out of the head A, which frees the drill E, during which operation the screw or stud F operates to prevent the bush D being displaced or forced completely out of the head A by engaging the bottom of the top split e.

What I claim as my invention, and desire to protect by Letters Patent, is—

1. A rock-drill chuck comprising a head or main portion constructed with an internal longitudinally-tapered cavity and a correspondingly-tapered bush split for a portion of its length to form a plurality of compressible jaws constructed to embrace the shank of the drill between said jaws, and made solid or closed at the inner and smaller end to form a stop or abutment to be engaged by the extremity of the drill-shank so that the bush is forced into the head by the drill, and the jaws thereby compressed to grip and secure the drill, substantially as described.

2. In combination in a rock-drill chuck, the head A formed with a longitudinally-tapered cavity C and a parallel inner recess at the bottom of said taper cavity, a correspondingly-tapered bush arranged in said tapered cavity, split to form the larger end of the bush into a plurality of compressible jaws and made solid at its smaller and inner end to form an abutment for the extremity of the drill-shank, and means for forcing the bush partially out of the head to release the drill substantially as described.

3. In combination in a rock-drill chuck, the head A, formed with a longitudinal taper cavity in the front thereof and with an inner parallel recess beyond the taper cavity, a correspondingly-tapered bush D split for a portion of its length in two directions at right angles to form four compressible jaws and closed or made solid at its inner and smaller end to form an abutment or stop for the extremity of the drill-shank when projected between the jaws, substantially as described.

4. In combination in a rock-drill chuck, the head A constructed with the longitudinal taper cavity and the inner parallel recess at the bottom of said taper cavity, the correspondingly-tapered bush D arranged in said taper cavity, split for a portion of its length in two directions at right angles so as to form the outer and larger portion of the bush into four compressible jaws and closed at its inner and smaller end to form an abutment to be engaged by the drill, by which means the bush is forced into the taper cavity in the head to close the jaws on the drill-shank to secure the drill, means for forcing the bush out of the head and means for preventing the bush being forced completely out of the head in the operation of detaching the drill, substantially as described.

5. In combination in a rock-drill chuck, the head A formed with the longitudinal taper cavity C and with the inner parallel recess $a$ at the bottom of said cavity, and with a transverse drift-hole G intercepting the parallel recess at the bottom, the correspondingly-tapered bush D split at its larger and outer end for a portion of its length in two directions at right angles to form four compressible jaws $d\ d'\ d^2\ d^3$ and closed or made solid at its inner and smaller end to form an abutment or stop to be engaged by the extremity of the drill-shank when projected between the jaws to force the bush into the head to secure the drill, the set screw or stud F screwed through the head into engagement with one of the slots to act as a stop by engaging the bottom end of the slot to prevent the bush being forced out of the head in the operation of removing the drill, and the drift or cotter H arranged in the transverse taper hole G in the head to engage the end of the bush to force the same partially out of the head to free the drill, substantially as described.

In witness whereof I have hereunto set my hand in the presence of two subscribing witnesses.

LEONARD LEIGH, Jr.

Witnesses:
 CHAS. OVENDALE,
 R. O. OVENDALE.